(12) United States Patent
Chen et al.

(10) Patent No.: US 9,354,311 B2
(45) Date of Patent: May 31, 2016

(54) REAL-TIME PROCESSING SYSTEM AND METHOD FOR PHASED ARRAY THREE-DIMENSIONAL ACOUSTICS IMAGE PICKUP SONAR

(75) Inventors: Yaowu Chen, Hangzhou (CN); Rongxin Jiang, Hangzhou (CN); Zhe Ji, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 551 days.

(21) Appl. No.: 13/995,022

(22) PCT Filed: Dec. 1, 2011

(86) PCT No.: PCT/CN2011/083269
§ 371 (c)(1),
(2), (4) Date: Jun. 17, 2013

(87) PCT Pub. No.: WO2012/079465
PCT Pub. Date: Jun. 21, 2012

(65) Prior Publication Data
US 2013/0272093 A1    Oct. 17, 2013

(30) Foreign Application Priority Data

Dec. 17, 2010    (CN) .......................... 2010 1 0594858

(51) Int. Cl.
*G01S 15/89*    (2006.01)
*G01S 7/62*    (2006.01)

(52) U.S. Cl.
CPC ............... *G01S 15/89* (2013.01); *G01S 7/6245* (2013.01)

(58) Field of Classification Search
CPC ........................................................ G01S 7/52
USPC ........... 367/88, 12, 87, 7, 106, 107, 124, 130, 367/138, 15, 153, 157, 173, 8, 89, 909, 91, 367/99; 342/357.57, 25 B; 701/21, 25, 29.1, 701/408, 469, 533; 137/565.01; 15/104.05; 29/592.1; 324/365; 345/427, 440; 351/206
See application file for complete search history.

(56) References Cited

U.S. PATENT DOCUMENTS 5,148,700 A * 9/1992 King .................... G01F 23/2962
367/104
5,530,901 A * 6/1996 Nitta ..................... G06F 3/1293
710/22

(Continued)

FOREIGN PATENT DOCUMENTS

CN    101359050    2/2009
CN    101625412    1/2010

*Primary Examiner* — Isam Alsomiri
*Assistant Examiner* — Amienatta M Ndure Jobe
(74) *Attorney, Agent, or Firm* — Jiwen Chen

(57) ABSTRACT

This invention discloses a real-time phased array 3D acoustic imaging sonar processing system and method. The system comprises a 3D sonar dot data collection module, a 3D sonar dot data uploading module and a real-time 3D sonar dot data processing module of PC terminal; the method includes the following content: make use of two-stage FPGA signal processing to realize real-time formation of electronic focusing wave beam, and acquire 3D sonar dot data; further transmit 3D sonar dot data to PC terminal for setting and acquisition of directives; PC terminal aims to receive 3D sonar dot data for real-time processing: This includes real-time single-frame multilayer reconstruction, image registration and splice, 3D visualization and real-time saving of data. This invention features in compact structure, high real-time precision, clear image, easy alternation and high extendibility, which has effectively realized the real-time 3D processing of sonar targets.

2 Claims, 1 Drawing Sheet

(56) References Cited

U.S. PATENT DOCUMENTS

| | | | | |
|---|---|---|---|---|
| 6,019,725 A * | 2/2000 | Vesely | ............... | A61B 8/0841 |
| | | | | 128/916 |
| 6,246,898 B1 * | 6/2001 | Vesely | ............... | A61B 5/0422 |
| | | | | 600/424 |
| 7,053,927 B2 * | 5/2006 | Jones | ............... | H04N 1/60 |
| | | | | 348/96 |
| 8,570,493 B2 * | 10/2013 | Mertz | ............... | G01C 15/002 |
| | | | | 356/3.01 |
| 2015/0092199 A1 * | 4/2015 | Steffey | ............... | G01B 11/002 |
| | | | | 356/614 |
| 2015/0253124 A1 * | 9/2015 | Steffey | ............... | G01B 21/045 |
| | | | | 356/614 |
| 2016/0011326 A1 * | 1/2016 | Caute | ............... | G01S 7/003 |
| | | | | 367/87 |

* cited by examiner

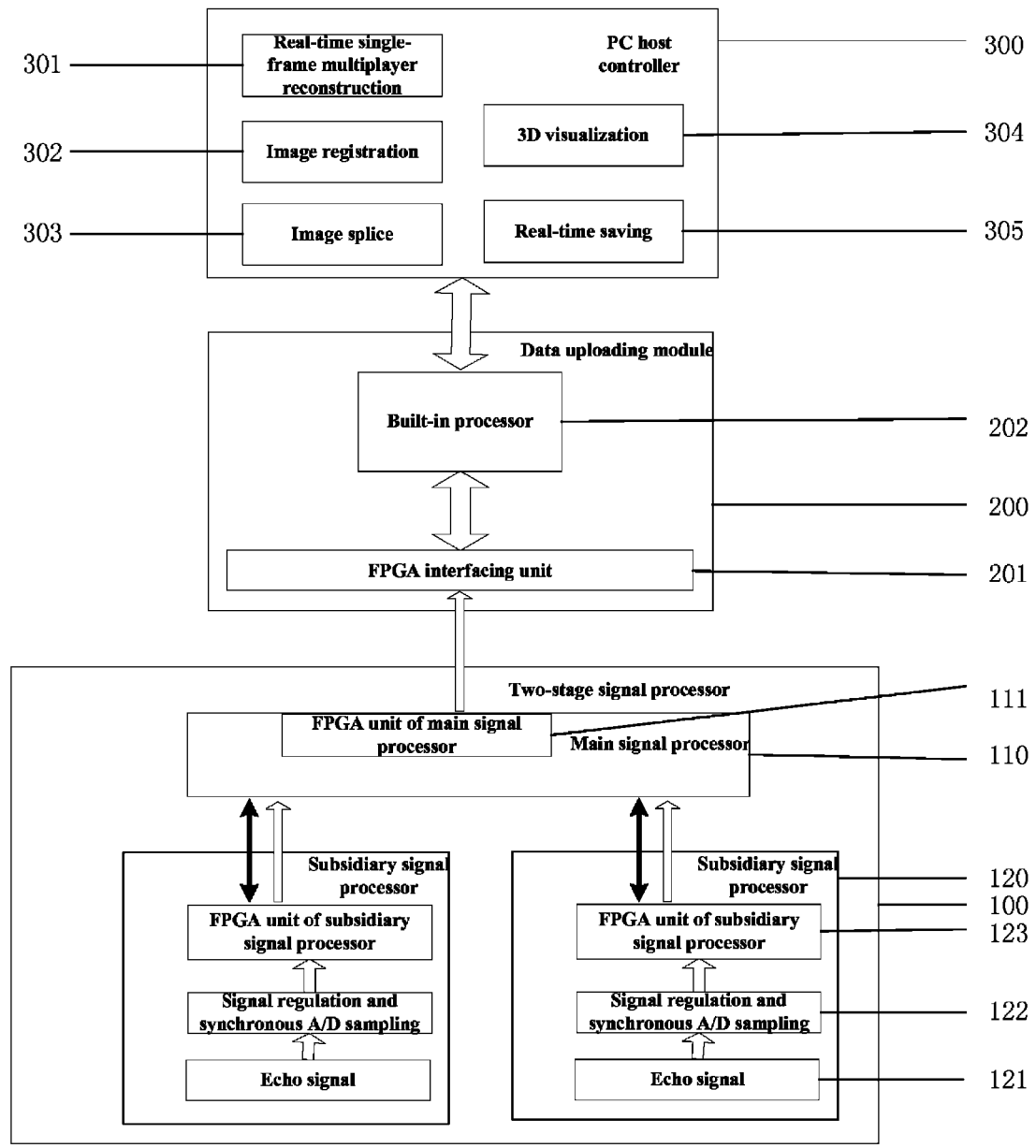

REAL-TIME PROCESSING SYSTEM AND METHOD FOR PHASED ARRAY THREE-DIMENSIONAL ACOUSTICS IMAGE PICKUP SONAR

FIELD OF THE INVENTION

This invention belongs to the field of phased array 3D acoustic imaging sonar, which is particularly related to a real-time phased array 3D acoustic imaging sonar processing system and method.

BACKGROUND OF THE INVENTION

With development of science and technologies, people have increasingly focused their attentions on the ocean owing to its important strategic position and indefinite economic potential. Meanwhile, people's recognition of the ocean has also further deepened. As transmission of sonic wave is relatively easy in the water, hydroacoustic acoustic detection has been extensively applied to the development of ocean resources. Hydroacoustic imaging technology has become an important approach for large-scale underwater detection.

So far, many imaging sonar detection technologies (such as scanning sonar and multibeam bathmatric sonar) have come into being continuously. Normally, such sonar equipments have resolution capability in the direction of distance and angle. To adapt to underwater operation of various sonar detection instruments, it is usually necessary to obtain 3D information on distance, angle and depth and resolution capability. As a 3D imaging sonar, phased array 3D acoustic imaging sonar can obtain target information on distance as well as horizontal and vertical 3D space, which features in clear image and real-time processing. However, owing to difficulty with its technical development, study of underwater 3D imaging system is only limited to few countries in the world. Presently, Echoscope1600 sonar series as developed by Norway is the relatively advanced 3D imaging sonar in the world. It is available for reconstruction of targets in the 3D environment and extraction of 3D coordinate (X, Y and Z) in the space in addition to imaging of one certain moving target. Therefore, study of real-time phased array 3D acoustic imaging sonar processing system has important and practical engineering value and significance of theoretical guidance.

SUMMARY OF THE INVENTION

This invention provides a real-time phased array 3D acoustic imaging sonar processing system and method, featuring in simple structure, high real-time precision, clear image, easy alternation, high extendibility and realization of effective 3D real-time processing of sonar targets.

A real-time phased array 3D acoustic imaging sonar processing system, including:

(1) A 3D sonar dot data collection module, comprising a FPGA (Field Programmable Gate Array) based main signal processor and numerous FPGA based subsidiary signal processors, which is used to obtain 3D sonar dot data through FPGA based two-stage signal processing; wherein, the FPGA based subsidiary signal processor aims to regulate echo signals received, and transmit them to FPGA of subsidiary signal processor for signal processing following synchronous A/D sampling; the FPGA based main signal processor aims to receive serial data from subsidiary signal processor before integration of data from each channel.

(2) A 3D sonar dot data uploading module, comprising interfaced FPGA and built-in processor, which is used to read and transmit 3D sonar dot data as collected by the 3D sonar dot data collection module to PC terminals through gigabit Ethernet, and realize synchronization of clock as well as acquisition and setting of directives;

(3) A real-time 3D sonar dot data processing module located inside the PC terminal, comprising a real-time single-frame multilayer reconstruction module, an image registration module, an image splice module, a 3D visualized module and a real-time memory module, wherein, The real-time single-frame multilayer reconstruction module is used to receive transmitted 3D sonar dot data from the 3D sonar dot data uploading module for resolution, and determine scanning beam where the 3D sonar dot is located as well as layer information and information on reflection intensity; all dots on each scanning beam are sorted on the sonar scanning beam array of the system as per layer sequence; single-frame multilayer reconstruction is executed based on this data structure through grid searching and connection of triangular patch;

The image registration module is used to acquire information on displacement and attitude of single-frame sonar data image from GPS and attitude instrument, and transfer sonar dots on each frame to the same preset world coordinate system; it is also used for registration of sonar data images of two adjacent frames, commencing from sonar data image of the second frame so as to correct deviation to displacement and attitude information: Determine overlapped area on the sonar data images of the two adjacent frames; acquire point set of sonar data images on the two adjacent frame within the overlapped area; project sonar data image of previous frame to the sonar data image of the follow-up frame by means of reverse projection, and realize pairing of all dots on the point set of sonar data image of the two adjacent frames within the overlapped area through searching of the nearest dots; meanwhile, it also aims to acquire registration matrix for the sonar data image of previous frame, and proceed with coordinate switchover for the point set of sonar data image of previous frame within the overlapped area;

The image splice module is used to integrate sonar data image of each frame to overall image through splice after coordinate switchover: Make use of referred grid to realize rasterization of sonar data image of previous and follow-up frames after coordinate switchover so as to obtain the cross point; integrate sonar data images of two frames to obtain unanimous grid data as per threshold value after deletion of high-frequency components; finally, obtain real-time overall 3D splice effect image through secondary reconstruction;

The 3D visualized module is used for real-time display of sonar data image of each frame on UI interface (User Interface) of the PC terminal in the form of 3D graph after secondary multilayer reconstruction. The system is available for simultaneous display of visual angle along axis X, Y and Z of single-frame sonar data image. Meanwhile, multi-frame splice effect is displayed in the form of 3D graph, commencing from the second frame. All 3D displays can support rotation, horizontal shift and zooming of 3D images and three graphic display forms presented by dot, grid and patch. It is applicable to make use of UI interface of PC terminal to realize real-time modification of relationship between intensity value of sonar dot and color of graphic display so as to obtain relation with intensity value of sonar dot as provided by graph color more intuitively. Moreover, single-frame 3D display can support dot selection with mouse to realize real-time acquisition of information on position and intensity value of certain dot on the 3D graph with the help of mouse.

The real-time memory module is used to store sonar data image of each frame on the local HD to facilitate further off-line review and processing. UI interface of PC terminal is available for setting of file saving path; whereas the system can store the same batch of sonar data in the file as nominated as per current system time through acquisition of current system time. Accompanied by the simultaneous saving of information on displacement and attitude of previous frame, sonar data in the same file will be saved as per the time sequence.

A real-time phased array 3D sonar acoustic imaging sonar processing method, comprising:
(1) Acquire 3D sonar dot data through FPGA based two-stage signal processing;
(2) Read and upload the 3D sonar dot data for further transmission to the PC terminal through gigabit ethernet, and realize synchronization of clock as well as acquisition and setting of directives;
(3) Proceed with real-time processing of 3D sonar dot data, including:

Real-time single-frame multilayer reconstruction steps: receiving 3D sonar dot data as transmitted from Step (2) for resolution so as to determine the scanning beam where 3D sonar dot is located as well as layer information and information on reflection intensity; all dots on each scanning beam are sorted on the sonar scanning beam array of the system according to layer sequence; single-frame multilayer reconstruction is executed based on this data structure through grid searching and connection of triangular patch;

Image registration steps: Acquire information on displacement and attitude of single-frame sonar data image from GPS and attitude instrument, and transfer sonar dots on each frame to the same preset world coordinate system; it is also used for registration of sonar data images of two adjacent frames, commencing from sonar data image of the second frame so as to correct deviation to displacement and attitude information: Determine overlapped area on the sonar data images of the two adjacent frames; acquire point set of sonar data images on the two adjacent frame within the overlapped area; project sonar data image of previous frame to the sonar data image of the follow-up frame by means of reverse projection, and realize pairing of all dots on the point set of sonar data image of the two adjacent frames within the overlapped area through searching of the nearest dots; meanwhile, it also aims to acquire registration matrix for the sonar data image of previous frame, and proceed with coordinate switchover for the point set of sonar data image of previous frame within the overlapped area according to the registration matrix.

Image splice steps: Integrate sonar data image of each frame to overall image through splice after coordinate switchover: Make use of referred grid to realize rasterization of sonar data image of previous and follow-up frames after coordinate switchover so as to obtain the cross point; integrate sonar data images of two frames to obtain unanimous grid data as per threshold value after deletion of high-frequency components; finally, obtain real-time overall 3D splice effect image through secondary reconstruction;

3D visualization steps: It aims to realize real-time display of sonar data image of each frame on UI interface of the PC terminal in the form of 3D graph after secondary multilayer reconstruction. The system is available for simultaneous display of visual angle along axis X, Y and Z of single-frame sonar data image. Meanwhile, multi-frame splice effect is to be displayed in the form of 3D graph, commencing from the second frame. All 3D displays can support rotation, horizontal shift and zooming of 3D images and three graphic display forms presented by dot, grid and patch. It is applicable to make use of UI interface of PC terminal to realize real-time modification of relationship between intensity value of sonar dot and color of graphic display so as to obtain relation with intensity value of sonar dot as provided by graph color more intuitively. Moreover, single-frame 3D display can support dot selection with mouse to realize real-time acquisition of information on position and intensity value of certain dot on the 3D graph with the help of mouse.

Real-time saving steps: Save sonar data image of each frame on the local HD to facilitate further off-line review and processing. UI interface of PC terminal is available for setting of file saving path; whereas the system can store the same batch of sonar data in the file as nominated as per current system time through acquisition of current system time. Accompanied by the simultaneous saving of information on displacement and attitude of previous frame, sonar data in the same file will be saved as per the time sequence.

As compared with present art, this invention is provided with the following beneficial technical effects:
Built-in processor works in the built-in Linux operation system to realize transmission of data as uploaded by FPGA in the kernel mode, which can minimize system call and overhead of data copies, effectively improve network transmission bandwidth, and satisfy requirements for high real-time processing by real-time processing system.
Image registration is in the mode of reverse projection, which can quickly and effectively realize registration of data in the two adjacent frames while ensuring the real-time processing and accuracy.

BRIEF DESCRIPTION OF DRAWINGS

FIG. 1 is the structural diagram for the real-time phased array 3D acoustic imaging sonar processing system of this invention.

PREFERRED EMBODIMENTS

This invention is described in details as follows in combination with embodiments and drawings. However, this invention is not limited to such aspects.
A real-time phased array 3D acoustic imaging sonar processing system as shown in FIG. 1, including:
(1) A 3D sonar dot data collection module 100, comprising: an FPGA based main signal processor 110 and a plurality of FPGA based subsidiary signal processors 120, which make use of two-stage FPGA signal processing to ensure real-time formation of electronic focusing wave beam based on signals from 48×48 sensors so as to acquire 3D sonar dot data; wherein, the subsidiary signal processors 120 aims to proceed with signal regulation and TVG control of echo signals 121, and send them to FPGA unit 123 of subsidiary signal processor for signal processing following A/D sampling 122; FPGA unit 111 of main signal processor 110 aims to receive serial data from each subsidiary signal processor 120 before integration of data from each channel.
(2) A 3D sonar dot data uploading module 200, comprising: an interfacing FPGA unit 201 and a built-in processor 202; the FPGA unit 201 aims to receive 3D sonar dot data as transmitted by the 3D sonar dot data collection module 100; whereas the built-in processor 202 aims to acquire 3D sonar dot data from interfacing FPGA unit 201 through local bus for further transmission to PC host controller via gigabit Ethernet. Meanwhile, it can also realize synchronization of clock, TVG setting as well as acquisition and setting of directives.
(3) A real-time 3D sonar dot data processing module 300 located inside the PC host controller, including a single-frame multilayer reconstruction module 301, an image registration module 302, an image splice module 303, a 3D visualized module 304 and a real-time memory module 305; wherein: the real-time single-frame multilayer reconstruction module 301 is used to receive transmitted 3D sonar dot data from 3D sonar dot data uploading module 200 for resolution, and determine scanning beam where the 3D sonar dot is located as well as layer information and information on reflection intensity; all dots on each scanning beam are sorted on the sonar scanning beam array of the system as per layer sequence; single-frame multilayer reconstruction is executed based on this data structure through grid searching and connection of triangular patch;

The image registration module 302 is used to acquire information on displacement and attitude of single-frame sonar data image from GPS and attitude instrument, and transfers sonar dots on each frame to the same preset world coordinate system. It is also used for registration of sonar data images of two adjacent frames, commencing from sonar data image of the second frame so as to correct deviation to displacement and attitude information: Determine overlapped area on the sonar data images of the two adjacent frames; acquire point set of sonar data images on the two adjacent frame within the overlapped area; project sonar data image of previous frame to the sonar data image of the follow-up frame by means of reverse projection, and realize pairing of all dots on the point set of sonar data image of the two adjacent frames within the overlapped area through searching of the nearest dots. Meanwhile, it also aims to acquire registration matrix for the sonar data image of previous frame, and proceed with coordinate switchover for the point set of sonar data image of previous frame within the overlapped area;

The image splice module 303 is used to integrate sonar data image of each frame to overall image through splice after coordinate switchover: Make use of referred grid to realize rasterization of sonar data image of previous and follow-up frames after coordinate switchover so as to obtain the cross point; integrate sonar data images of two frames to obtain unanimous grid data according to threshold value after deletion of high-frequency components; finally, obtain real-time overall 3D splice effect image through secondary reconstruction.

The 3D visualized module 304 is used for real-time display of sonar data image of each frame on UI interface of the PC terminal in the form of 3D graph after secondary multilayer reconstruction. The system is available for simultaneous display of visual angle along axis X, Y and Z of single-frame sonar data image. Meanwhile, the multi-frame splice effect is to be displayed in the form of 3D graph, commencing from the second frame. All 3D displays can support rotation, horizontal shift and zooming of 3D images and three graphic display forms presented by dot, grid and patch. It is applicable to make use of UI interface of PC terminal to realize real-time modification of relationship between intensity value of sonar dot and color of graphic display so as to obtain relation with intensity value of sonar dot as provided by graph color more intuitively. Moreover, single-frame 3D display can support dot selection with mouse to realize real-time acquisition of information on position and intensity value of certain dot on the 3D graph with the help of mouse.

The real-time memory module 305 is used to store sonar data image of each frame on the local HD to facilitate further off-line review and processing. UI interface of PC terminal is available for setting of file saving path; whereas the system can store the same batch of sonar data in the file as nominated as per current system time through acquisition of current system time. Accompanied by the simultaneous saving of information on displacement and attitude of previous frame, sonar data in the same file will be saved as per the time sequence.

A real-time phased array 3D sonar acoustic imaging sonar processing method, including:

(1) a 3D sonar dot data collection module 100 aims to realize real-time formation of electronic focusing wave beam through signal processing with two-stage FPGA, and acquire 3D sonar dot data;

(2) A 3D sonar dot data uploading module 200 aims to acquire real-time data from an interfacing FPGA unit 201 through local bus for further transmission to real-time 3D sonar processing module 300 of PC host controller via gigabit ethernet; meanwhile, the 3D sonar dot data uploading module 200 can realize synchronization of clock, TVG setting as well as acquisition and setting of directives.

(3) A real-time sonar processing module 300 of PC host controller aims to realize real-time processing of sonar data after receiving of uploaded data, including: Make use of a real-time single-frame multilayer reconstruction module 301 to realize a real-time single-frame multilayer reconstruction; make use of an image registration module 302 to realize image registration; make use of an image splice module 303 to realize image splice; make use of 3D visualized module 304 to realize 3D visualization; and make use of a real-time saving module 305 to proceed with real-time saving of data.

The invention claimed is:

1. A real-time phased array 3D acoustic imaging sonar processing system, comprising:
    (1) a 3D sonar dot data collection module, comprising an Field Programmable Gate Array based main signal processor and a plurality of Field Programmable Gate Array based subsidiary signal processors; wherein the 3D sonar dot data collection module is used to obtain the 3D sonar dot data through a Field Programmable Gate Array based two-stage signal processing;
    (2) a 3D sonar dot data uploading module, comprising an interfaced Field Programmable Gate Array and built-in processor; wherein the 3D sonar dot data uploading module is used to read and transmit the 3D sonar dot data as collected by the 3D sonar dot data collection module to PC terminals through a gigabit Ethernet, and realize synchronization of clock, acquisition and setting of directives;
    (3) a real-time 3D sonar dot data processing module located inside the PC terminal, comprising a real-time single-frame multilayer reconstruction module, an image registration module, an image splice module, a 3D visualized module and a real-time memory module;
wherein,
    the real-time single-frame multilayer reconstruction module is used to receive the transmitted 3D sonar dot data from the 3D sonar dot data uploading module for resolution, and determine a scanning beam where the 3D sonar dot, a layer information and an information on reflection intensity are located; all dots on each scanning beam are sorted on a sonar scanning beam array of the system as per a layer sequence; a single-frame multilayer reconstruction is executed based on a data structure through a grid search and connection of a triangular patch;
    the image registration module is used to acquire information on displacement and attitude of the single-frame sonar data image from a GPS and an attitude instrument, and transfer the sonar dots on each frame to a preset world coordinate system; wherein the image registration module is used for the registration of sonar data images of two adjacent frames, commencing from sonar data image of a second frame to correct deviation to displacement and attitude information: determining an overlapped area on the sonar data images of the two adjacent frames; acquiring point set of sonar data images on the two adjacent frame within the overlapped area; projecting sonar data image of a previous frame to the sonar data image of the follow-up frame by means of reverse projection, and realizing pairing of all dots on the point set of the sonar data image of the two adjacent frames within the overlapped area through searching of the nearest dots; the image registration module acquires registration a matrix for the sonar data image of the previous frame, and proceeds with a coordinate switchover for the point set of sonar data image of the previous frame within the overlapped area;

the image splice module is used to integrate sonar data image of each frame into an overall image through splicing after the coordinate switchover: making use of a referred grid to realize a rasterization of the sonar data image of the previous and follow-up frames after the coordinate switchover so as to obtain a cross point; integrating sonar data images of two frames to obtain a unanimous grid data according to a threshold value after a deletion of high-frequency components; obtaining real-time overall 3D splice effect image through a secondary reconstruction;

the 3D visualized module is used for real-time display of sonar data image of each frame on a User Interface of the PC terminal in the form of a 3D graph after a secondary multilayer reconstruction;

the real-time memory module is used to store sonar data image of each frame on a local Hard Drive to facilitate further off-line review and processing.

2. A real-time phased array 3D sonar acoustic imaging sonar processing method, characterized in that:

(1) acquiring 3D sonar dot data through Field Programmable Gate Array based two-stage signal processing;

(2) reading and uploading the 3D sonar dot data for further transmission to PC terminals through a gigabit Ethernet, and realizing synchronization of clock, acquisition and setting of directives;

(3) real-time processing of 3D sonar dot data, comprising: real-time single-frame multilayer reconstruction steps: receiving the 3D sonar dot data as transmitted from Step (2) for resolution to determine a scanning beam where the 3D sonar dot, a layer information and an information on reflection intensity is located; wherein the 3D sonar dot data on the scanning beam are sorted on a sonar scanning beam array of the system according to layer sequence; the single-frame multilayer reconstruction is executed based on a data structure through a grid search and connection of a triangular patch;

image registration steps comprising: acquiring information on displacement and attitude of the single-frame sonar data image from a GPS and an attitude instrument, and transfer the sonar dots on each frame to a preset world coordinate system; wherein the image registration module is used for registration of sonar data images of two adjacent frames, commencing from sonar data image of the second frame to correct deviation to displacement and attitude information: determining an overlapped area on the sonar data images of the two adjacent frames; acquire point set of sonar data images on the two adjacent frame within the overlapped area; projecting sonar data image of a previous frame to the sonar data image of the follow-up frame by means of reverse projection, and realizing pairing of all dots on the point set of sonar data image of the two adjacent frames within the overlapped area through searching of the nearest dots; the image registration module acquires a registration matrix for the sonar data image of the previous frame, and proceeds with a coordinate switchover for the point set of sonar data image of the previous frame within the overlapped area according to the said registration matrix;

image splice steps comprising: integrating sonar data image of each frame to an overall image through splicing after the coordinate switchover: making use of a referred grid to realize a rasterization of the sonar data image of the previous and follow-up frames after the coordinate switchover so as to obtain a cross point; integrating sonar data images of two frames to obtain a unanimous grid data as per a threshold value after a deletion of high-frequency components; obtaining real-time overall 3D splice effect image through a secondary reconstruction;

3D visualized step comprising: areal-time display of sonar data image of each frame on a User Interface of the PC terminal in the form of a 3D graph after a secondary multilayer reconstruction;

a real-time memory step, used to store sonar data image of each frame on a local Hard Drive to facilitate further off-line review and processing.

* * * * *